United States Patent Office 3,703,492
Patented Nov. 21, 1972

3,703,492
PROCESS FOR THE PREPARATION OF AQUEOUS EMULSIONS OF WATER-RESISTANT VINYL ACETATE-ETHYLENE COPOLYMERS
Shiro Masuda, Takashi Ohkubo, and Yu Furukawa, Niigata, Japan, assignors to Denki Kagaku Kogyo Kabushiki Kaisha, Tokyo, Japan
No Drawing. Filed Apr. 21, 1970, Ser. No. 30,574
Claims priority, application Japan, Apr. 21, 1969, 44/30,253
Int. Cl. C09j 3/26
U.S. Cl. 260—27 EV     14 Claims

ABSTRACT OF THE DISCLOSURE

A process for the production of ethylene-vinyl acetate copolymer emulsions comprising copolymerizing vinyl acetate and ethylene in the presence of rosin at a temperature not exceeding 65° C. and at a pressure of 10–100 kg./cm.$^2$ gauge.

BACKGROUND OF THE INVENTION

(1) Field of the invention

This invention relates to a process for the preparation of aqueous emulsions of vinyl acetate-ethylene copolymers having an improved water resisting property which are suitable for use as adhesives.

(2) Description of the prior art

Although various processes have been proposed with respect to the manufacture of vinyl acetate-ethylene copolymer emulsion adhesives, no process is known which especially improves the water-resisting property of such adhesives.

Vinyl acetate-ethylene copolymer emulsions are regarded as adhesives having an improved water-resisting property from the viewpoint of the introduction of hydrophobic atomic groups into the vinyl acetate polymer. However, they are not always satisfactory in their water-resisting property and are markedly inferior to prior art acrylic emulsion adhesives when put in practical use and, therefore, there is a great demand for vinyl acetate emulsion adhesives having an improved water-resisting property.

It has been said that the weakest point of vinyl acetate homopolymer emulsions as adhesives for wood, paper or the like, is their lack of a superior water-resisting property. In general, synthetic resin emulsions contain hydrophilic surface active agents and/or protective colloids, so that a dry film formed therefrom absorbs water and becomes soaked and has a remarkably reduced bonding strength.

The water-resisting property of vinyl acetate polymer emulsion adhesives may be improved by various methods, e.g.:

(1) by incorporating into vinyl acetate-ethylene copolymer emulsions a urea-formaldehyde resin, a melamine-formaldehyde resin, a phenolic resin or a like thermosetting resin, although this reduces the pliability of vinyl acetate-ethylene copolymers and their adhesion to plastics in, e.g., the bonding of vinyl chloride resin sheets to plywood, (2) by the copolymerization of only a large amount of a third monomer, e.g., an acrylic comonomer such as butyl- or 2-ethylhexyl acrylate, or (3) by the addition of toluene, but this is hardly effective with respect to improving the water-resisting property.

The present invention has for its object a method of preparing an adhesive having a greatly improved water-resisting property compared with prior art vinyl acetate-ethylene copolymer emulsion adhesives by copolymerizing vinyl acetate and ethylene in the presence of rosin.

SUMMARY OF THE INVENTION

According to the present invention, a process for the preparation of vinyl acetate-ethylene copolymer emulsions having an improved water-resisting property is provided, comprising copolymerizing vinyl acetate with ethylene and, if desired, one or more monomers copolymerizable therewith in an aqueous dispersion, wherein the copolymerization is conducted in the presence of from 0.05 to 1.5%, based on the weight of vinyl acetate contained in the system, of at least one member selected from the group consisting of wood rosin, gum rosin, petroleum rosin and derivatives thereof, at a temperature not exceeding 65° C. and under a pressure of from 10 to 100 kg./cm.$^2$ gauge.

DETAILED DESCRIPTION OF THE PREFERRED EMBODIMENTS

Detailed illustrations with respect to the reaction conditions and chemicals used in the practice of the present invention will be given hereinafter.

Polymerization pressure (10 kg./cm.$^2$G to 100 kg./cm.$^2$G)

The pressure controls the ethylene content of the resulting copolymer, and a pressure of from 40 to 80 kg./cm.$^2$G is preferred to obtain an ethylene content of from 25 to 12% by weight. Although the ethylene content varies to a certain extent depending on polymerization time, under a pressure above 100 kg./cm.$^2$G, a copolymer is formed having an ethylene content exceeding 25% by weight which has a low mechanical strength and undesirably low adhesion. On the other hand, under a pressure below 10 kg./cm.$^2$G a copolymer is formed having an ethylene content of less than 5% by weight which is similar in properties to a vinyl acetate homopolymer and lacks pliability and adhesion to plastics.

The polymerization temperature is varied within a certain range according to the catalyst employed, in general, a polymerization mixture is maintained at 40° to 65° C. until the conversion of vinyl acetate reaches 80% to 90% and then is aged at 65° C. to 80° C. to attain a conversion of vinyl acetate of 100%. Since the emulsion becomes unstable and will gelatinize if the temperature becomes 65° C. or higher, the temperature is preferably maintained at 55° C. to 65° C. during the course of the polymerization and at about 70° C. during the course of the ageing.

Any surface active agent may be used in the emulsion polymerization in accordance with the present invention, and it is possible to produce a stable emulsion by the use of polyvinyl alcohol alone.

Any known protective colloid may be conveniently used in the emulsion such as, e.g., polyvinyl alcohol, or its derivatives, such as partially acetalized polyvinyl alcohol.

The particular rosin used may be either wood rosin, gum rosin, tall oil rosin, petroleum rosin or derivatives thereof, such as, e.g., glycerol esters. Mixtures thereof may also be used.

The rosin may be used in an amount of from 0.05 to 1.5 weight percent, preferably from 0.1 to 1.0 weight percent, of the weight of vinyl acetate. An amount less than 0.5% brings about little effect of the present invention. In amounts above 1.5%, the rate of polymerization is too low and, on occasion, gelation takes place.

The catalyst which may be used includes peroxides such as, e.g., potassium persulfate, ammonium persulfate, benzoyl peroxide, hydrogen peroxide and mixtures thereof. A combination of such peroxides with reducing agents such as, e.g., sodium bisulfite, ascorbic acid or sodium thiosulfate, may also be used.

The catalyst is preferably used in an amount of from 0.05 to 5% by weight, based on the weight of vinyl acetate.

The copolymerizable monomer which may be used in the process of the present invention for copolymerization with vinyl acetate and ethylene includes vinyl propionate, vinyl laurate, vinyl pivalate, vinyl versatate and like vinyl esters; methyl acrylate, ethyl acrylate, butyl acrylates, 2-ethylhexyl acrylate and like acrylate esters; acrylic acid and its salts; maleic acid and diethylmaleate, dibutyl maleate and like maleate esters; n-butyl vinyl ether, ethyl vinyl ether and like vinyl ethers; vinyl chloride, vinyl fluoride, vinyl bromide; acrylonitrile and sodium vinylsulfonate.

The process of the present invention is applicable not only to the preparation of vinyl acetate-ethylene copolymers but also to the preparation of copolymers of a vinyl ester, including vinyl acetate, and a lower olefin, including ethylene.

The process of the present invention is also effective in the preparation of terpolymer emulsions using any of the aforementioned monomers such as, e.g., butyl acrylate or vinyl chloride.

EXAMPLE I

A 2 liter stainless autoclave equipped with a paddle-type stirrer was charged with 636 g. of vinyl acetate, 546 g. of water, 1.33% (all percent were based on the weight of vinyl acetate) of a first surface active agent (Neugen EA 190D), 0.67% of a second surface active agent (Neugen EA 130T), 2% of a polyvinyl alcohol (Denka Poval B-17) and 2% of Denka Poval B-05, 1.0 g. of $Na_2CO_3$ as a buffer, and a wood rosin (Staybelite Resin) and ammonium persulfate as a catalyst, the latter two being added in the amounts as listed in the following Table 1. The polymerization was conducted at a polymerization temperature of 63° C. and at a stirring speed of 240 r.p.m. while maintaining the ethylene pressure in the autoclave at 50 kg./cm.$^2$ gauge so as to obtain a copolymer of a substantially uniform ethylene content of about 15% by weight.

TABLE 1

| Run No. | Rosin (percent VAc) | Catalyst (g.) | Polymerization time (hrs.) | Solid content (percent) | Conversion (percent) | Ethylene content (percent) | Viscosity, BM-type, 30° C. rotor No. 4, 30 r.p.m |
|---|---|---|---|---|---|---|---|
| 1 | 0 | 1.05 | 9 | 55.5 | 101.9 | 16.3 | 7,300 |
| 2 | 0.1 | 1.5 | 12 | 56.0 | 102.6 | 17.8 | 13,680 |
| 3 | 0.5 | 3.5 | 9 | 54.9 | 100.6 | 18.5 | 19,140 |
| 4 | 1.0 | 4.5 | 11 | 54.5 | 104.9 | 16.7 | 31,000 |

EXAMPLE II

Runs 5 to 8 were carried out using the same procedure as in Example 1 except that the ethylene pressure was maintained at 60 kg./cm.$^2$ gauge. The results obtained are shown in the following Table 2.

TABLE 2

| Run No. | Rosin (percent VAc) | Catalyst (g.) | Polymerization time (hrs.) | Solid content (percent) | Conversion (percent) | Ethylene content (percent) | Viscosity BM-type 30° C. rotor No. 4 30 r.p.m |
|---|---|---|---|---|---|---|---|
| 5 | 0 | 1.05 | 9 | 54.7 | 100.8 | 20.8 | 17,850 |
| 6 | 0.1 | 1.4 | 12 | 56.0 | 102.6 | 22.4 | 11,500 |
| 7 | 0.5 | 4.0 | 11 | 55.4 | 102.4 | 18.0 | 13,680 |
| 8 | 1.0 | 5.0 | 13 | 57.9 | 107.4 | 22.7 | 18,400 |

EXAMPLE III

A second-class plywood sheet was bonded to a rigid and a soft vinyl chloride resin sheet using the emulsions prepared in Examples I or II. The emulsion adhesive was applied in an amount of from 100 to 120 g./m.$^2$. The laminate was first pressed under a pressure of 0.1 kg./cm.$^2$ at 20° C. and 65% R.H. for 24 hours and then dried in the same atmosphere for 24 hours. A portion of the finished laminate thus obtained was subjected to a peeling test to determine the bonding strength (friction pull-off strength) under normal conditions, and another portion of the finished laminate was soaked in water at 20° C. for 24 hours and then, as it was wet, subjected to a peeling test to determine the wet bonding strength. The results obtained are summarized in the following Table 3. The bonding strengths were 180° peeling strengths measured by the aid of Shimadzu Autograph P-100 at a peeling rate of 280 mm./min.

TABLE 3.—BONDING STRENGTHS OF ROSIN-MODIFIED POLYMERIZATES

| Run Number | Compounding ratio [1] | Normal bonding strength (kg./in.) | | Wet bonding strength (kg./in.) | |
|---|---|---|---|---|---|
| | | Soft VC resin | Rigid VC resin | Soft VC resin | Rigid VC resin |
| 1 | 1 | 2.7 | 7.9 | 0.8 | 0.3 |
|   | 2 | 2.8 | 6.5 | 0.8 | 0.6 |
|   | 3 | 2.6 | 6.7 | 0.7 | 0.7 |
| 2 | 1 | 2.9 | 7.4 | 0.9 | 0.8 |
|   | 2 | 3.8 | 6.2 | 1.5 | 0.6 |
|   | 3 | 2.9 | 7.7 | 3.3 | 0.5 |
| 3 | 1 | 3.9 | (²) | 0.6 | 1.4 |
|   | 2 | 4.4 | 8.1 | 1.4 | 3.3 |
| 4 | 1 | 4.3 | 8.4 | 1.1 | 1.6 |
|   | 2 | 3.9 | 8.5 | 1.6 | 4.3 |
|   | 3 | 4.4 | 6.5 | 2.2 | 2.2 |
| 5 | 1 | 2.8 | 8.0 | 0.8 | 0.6 |
|   | 2 | 2.8 | 6.9 | 1.1 | 1.6 |
|   | 3 | 3.0 | 6.7 | 1.3 | 1.7 |
| 6 | 1 | 2.9 | 7.4 | 0.9 | 0.8 |
|   | 2 | 3.8 | 6.2 | 1.2 | 1.5 |
|   | 3 | 2.9 | 7.7 | 1.5 | 3.3 |
| 7 | 1 | 3.8 | 8.8 | 1.3 | 1.7 |
|   | 2 | 4.3 | 9.8 | 1.6 | 4.8 |
|   | 3 | 3.4 | 4.5 | 2.1 | 3.9 |
| 8 | 1 | 4.1 | 7.5 | 1.3 | 1.9 |
|   | 2 | 3.3 | 9.2 | 3.6 | 4.9 |
|   | 3 | 4.8 | 4.0 | 3.1 | 2.7 |

[1] Compound ratio: 1.—Emulsion alone; 2.—Emulsion/dibutyl phthalate=25/1 (weight ratio); 3.—Emulsion/toluene/dibutyl phthalate=25/2/1 (weight ratio).
[2] Undeterminable.

EXAMPLE IV

Terpolymer emulsions were prepared using as a third component butyl acrylate, acrylic acid, vinyl versatate or vinyl chloride in the same manner as in Example I and a determination of the normal and wet bonding strengths was made in the same manner as in Example III. The results are summarized in the following Table 4.

TABLE 4

| Run Number | Third component, amount added (weight ratio) | Staybelite resin [1] (percent monomer) | Compounding ratio | Normal bonding strength kg./in. | |
|---|---|---|---|---|---|
| | | | | Soft VC resin | Rigid VC resin |
| 9 | VAc/butyl acrylate, 90/10 | 0 | 1 | 3.0 | (²) |
|   |   |   | 2 | 3.2 | 8.4 |
|   |   |   | 3 | 3.0 | 7.2 |
| 10 | do | 0.7 | 1 | 3.5 | (²) |
|   |   |   | 2 | 3.3 | 7.0 |
|   |   |   | 3 | 4.0 | 8.2 |
| 11 | Acrylic acid, 1%/VAc | 0 | 1 | 2.7 | (²) |
|   |   |   | 2 | 2.8 | 8.2 |
|   |   |   | 3 | 2.8 | 7.6 |
| 12 | do | 0.7 | 1 | 3.2 | 7.8 |
|   |   |   | 2 | 3.0 | 8.0 |
|   |   |   | 3 | 2.9 | 8.5 |
| 13 | VAc/vinyl versatate, 90/10 | 0 | 1 | 3.8 | 9.5 |
|   |   |   | 2 | 3.0 | 7.9 |
|   |   |   | 3 | 3.4 | 9.0 |
| 14 | do | 0.7 | 1 | 3.5 | 7.6 |
|   |   |   | 2 | 3.8 | 8.2 |
|   |   |   | 3 | 3.8 | 8.5 |
| 15 | VAc/vinyl chloride, 90/10 | 0 | 1 | 2.3 | 5.8 |
|   |   |   | 2 | 1.5 | 6.2 |
|   |   |   | 3 | 2.8 | 6.8 |
| 16 | do | 0.7 | 1 | 2.8 | 5.6 |
|   |   |   | 2 | 3.0 | 6.0 |
|   |   |   | 3 | 2.5 | 7.5 |

[1] Staybelite resin is a pale-colored, thermoplastic acidic resin made by hydrogenating wood rosin.
[2] Undeterminable.

What is claimed is:

1. A process for the preparation of vinyl acetate-ethylene copolymer emulsions having an improved water resistance comprising copolymerizing vinyl acetate and ethylene in an aqueous dispersion containing from 0.05 to 1.5 weight percent, based on the weight of vinyl acetate, of rosin at a temperature not exceeding 65° C. and at a pressure of from about 10 to about 100 kgs./cm.² gauge.

2. The process as in claim 1, wherein the rosin is at least one member selected from the group consisting of wood rosin, gum rosin, tall oil rosin.

3. The process as in claim 1 wherein the pressure during copolymerization varies from about 40 to about 80 kgs./cm.² gauge to provide a vinyl acetate-ethylene copolymer having an ethylene content of from about 12 to 25% by weight.

4. The process as in claim 1 wherein the temperature during polymerization is maintained at from 40 to 65° C., until the vinyl acetate conversion reaches from 80 to 90% and further comprising ageing the polymerization mixture at a temperature of from about 65 to 80° C., to attain a conversion of vinyl acetate of about 100%.

5. The process as in claim 1 wherein said rosin is present during said copolymerization in an amount of from 0.1 to 1.0% by weight based on the weight of vinyl acetate.

6. In a process for the preparation of copolymer emulsions comprising copolymerizing vinyl acetate, ethylene and at least one other monomer copolymerizable therewith in an aqueous dispersion, the improvement comprising conducting the copolymerization in an aqueous dispersion containing from 0.05 to 1.5 wt. percent of rosin at a temperature not exceeding 65° C., and at a pressure of from about 10 to about 100 kgs./cm.² gauge to thereby give a terpolymer having an improved water resistance.

7. The process as in claim 6, wherein said monomer copolymerizable with vinyl acetate and ethylene is a member selected from the group consisting of vinyl esters, acrylate esters, acrylic acid and its salts, maleic acid and maleate esters, vinyl ethers, vinyl halides, acrylonitrile and sodium vinylsulfonate.

8. The process as in claim 6, wherein said rosin is at least one member selected from the group consisting of wood rosin, gum rosin, tall oil rosin, and derivatives thereof.

9. The process as in claim 6 wherein the pressure during copolymerization varies from about 40 to about 80 kgs./cm.² gauge to provide a vinyl acetate-ethylene copolymer having an ethylene content of from about 12 to 25 wt. percent.

10. The process as in claim 6 wherein the temperature of polymerization varies from about 40 to 65° C., until the conversion of vinyl acetate reaches from 80 to 90% and further comprising ageing the polymerization mixture at a temperature of from about 65 to 80° C., to attain a conversion of vinyl acetate of about 100%.

11. The process as in claim 6 wherein said rosin is present during copolymerization in an amount of from 0.1 to 1.0% by weight, based on the weight of vinyl acetate.

12. The process as in claim 7, wherein said vinyl ester is selected from the group consisting of vinyl propionate, vinyl laurate, vinyl pivalate and vinyl versatate; said acrylate ester is selected from the group consisting of methyl acrylate, ethyl acrylate, butyl acrylate and 2-ethylhexyl acrylate; said maleate esters are selected from the group consisting of diethyl maleate and dibutyl maleate; said vinyl ethers are selected from the group consisting of n-butyl vinyl ether and ethyl vinyl ether and said vinyl halides are selected from the group consisting of vinyl chloride, vinyl fluoride and vinyl bromide.

13. In a process for the preparation of copolymer emulsions comprising copolymerizing a vinyl ester and a lower olefin in an aqueous dispersion, the improvement comprising conducting the copolymerization in an aqueous dispersion containing from 0.05 to 1.5% by weight, based on the weight of said vinyl ester, of rosin at a temperature not exceeding 65° C., and at a pressure of from about 10 to about 100 kgs./cm.³ gauge.

14. The process as in claim 13 further comprising copolymerizing said vinyl ester and said lower olefin with at least one additional monomer copolymerizable therewith.

References Cited

UNITED STATES PATENTS

| | | | |
|---|---|---|---|
| 3,232,895 | 2/1966 | Klein et al. | 260—27 |
| 2,449,489 | 9/1948 | Larson | 260—27 |

FOREIGN PATENTS

| | | | |
|---|---|---|---|
| 1,048,797 | 11/1966 | Great Britain | 260—27 |
| 595,005 | 11/1947 | Great Britain | 260—27 |
| 582,093 | 11/1946 | Great Britain | 260—27 |

DONALD E. CZAJA, Primary Examiner

W. E. PARKER, Assistant Examiner

U.S. Cl. X.R.

156—251; 161—332; 260—844, 851